(12) United States Patent
Ingman et al.

(10) Patent No.: US 7,840,434 B2
(45) Date of Patent: Nov. 23, 2010

(54) METHODS AND SYSTEMS FOR ASSIGNING MULTIPLE TASKS

(75) Inventors: Robert Mitchell Ingman, Peachtree City, GA (US); Gary J. Dennis, Duluth, GA (US); Charlie Garris, Peachtree City, GA (US); Oscar J. Primelles, Atlanta, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 1564 days.

(21) Appl. No.: 10/282,437

(22) Filed: Oct. 29, 2002

(65) Prior Publication Data
US 2004/0111313 A1 Jun. 10, 2004

(51) Int. Cl.
*G06F 9/46* (2006.01)
(52) U.S. Cl. .................... 705/9; 705/8; 705/301; 705/305; 705/320; 715/716; 715/733; 715/748; 715/751
(58) Field of Classification Search ............ None
See application file for complete search history.

(56) References Cited

U.S. PATENT DOCUMENTS

| | | | | |
|---|---|---|---|---|
| 2,909,128 | A | * | 10/1959 | Keen ................. 104/88.02 |
| 3,304,416 | A | * | 2/1967 | Wolf .................... 377/13 |
| 3,500,557 | A | * | 3/1970 | White .................. 434/108 |
| 3,571,949 | A | * | 3/1971 | Gormley ............... 434/108 |
| 3,780,695 | A | * | 12/1973 | Richard ................ 116/202 |
| 4,937,743 | A | * | 6/1990 | Rassman et al. ........... 705/8 |
| 5,111,391 | A | * | 5/1992 | Fields et al. ............. 705/9 |
| 5,125,513 | A | * | 6/1992 | Branch ................. 209/3.3 |
| 5,467,268 | A | * | 11/1995 | Sisley et al. ............. 705/9 |
| 5,634,055 | A | * | 5/1997 | Barnewall et al. .......... 1/1 |
| 5,682,421 | A | * | 10/1997 | Glovitz et al. ........ 379/100.05 |
| 5,726,884 | A | * | 3/1998 | Sturgeon et al. ............ 705/9 |
| 5,881,131 | A | | 3/1999 | Farris et al. |
| 5,887,243 | A | * | 3/1999 | Harvey et al. ............ 725/136 |
| 5,920,846 | A | * | 7/1999 | Storch et al. .............. 705/7 |
| 5,943,652 | A | * | 8/1999 | Sisley et al. ............. 705/9 |
| 5,999,908 | A | * | 12/1999 | Abelow ................. 705/7 |
| 5,999,990 | A | * | 12/1999 | Sharrit et al. ............ 710/8 |
| 6,049,776 | A | * | 4/2000 | Donnelly et al. ........... 705/8 |
| 6,085,166 | A | | 7/2000 | Beckhardt |

(Continued)

FOREIGN PATENT DOCUMENTS

JP        08044799        2/1996

(Continued)

OTHER PUBLICATIONS

Lesaint et al. "Dynaic Workforce Scheduling for Brisish Telecomminications" Informs. Jan.-Feb. 2000.*

(Continued)

*Primary Examiner*—Romain Jeanty
*Assistant Examiner*—Gurkanwaljit Singh
(74) *Attorney, Agent, or Firm*—Scott P. Zimmerman, PLLC

(57) ABSTRACT

Methods and systems are disclosed for assigning multiple tasks to a technician. One method allows a user to interface with an Integrated Dispatch System and assign multiple tasks to at least one technician. Each task describes a repair of a telecommunications network. The method displays a graphical user interface on a computer, and the graphical user interface indicates the assignment of the multiple tasks.

14 Claims, 7 Drawing Sheets

U.S. PATENT DOCUMENTS

| | | | |
|---|---|---|---|
| 6,169,517 B1 | 1/2001 | Eslambolchi et al. | |
| 6,272,457 B1 | 8/2001 | Ford et al. | |
| 6,349,238 B1* | 2/2002 | Gabbita et al. | 700/101 |
| 6,578,005 B1* | 6/2003 | Lesaint et al. | 705/8 |
| 6,611,751 B2 | 8/2003 | Warren | |
| 6,662,194 B1* | 12/2003 | Joao | 1/1 |
| 6,850,895 B2* | 2/2005 | Brodersen et al. | 705/9 |
| 6,873,949 B2 | 3/2005 | Hickman et al. | |
| 6,879,962 B1* | 4/2005 | Smith et al. | 705/22 |
| 6,985,872 B2* | 1/2006 | Benbassat et al. | 705/8 |
| 6,990,458 B2* | 1/2006 | Harrison et al. | 705/8 |
| 7,003,475 B1 | 2/2006 | Friedland et al. | |
| 7,013,284 B2* | 3/2006 | Guyan et al. | 705/9 |
| 7,107,285 B2 | 9/2006 | Von Kaenel et al. | |
| 7,212,985 B2* | 5/2007 | Sciuk | 705/8 |
| 7,340,037 B1 | 3/2008 | Jean et al. | |
| 7,346,531 B2 | 3/2008 | Jacobs | |
| 7,437,727 B2* | 10/2008 | Leong et al. | 718/104 |
| 2001/0021910 A1* | 9/2001 | Goldstein | 705/2 |
| 2001/0042001 A1* | 11/2001 | Goto et al. | 705/9 |
| 2001/0051905 A1* | 12/2001 | Lucas | 705/29 |
| 2002/0007289 A1* | 1/2002 | Malin et al. | 705/4 |
| 2002/0010610 A1* | 1/2002 | Jacobs et al. | 705/8 |
| 2002/0010614 A1* | 1/2002 | Arrowood | 705/9 |
| 2002/0010615 A1* | 1/2002 | Jacobs | 705/9 |
| 2002/0022984 A1* | 2/2002 | Daniel et al. | 705/8 |
| 2002/0029160 A1* | 3/2002 | Thompson et al. | 705/8 |
| 2002/0029161 A1* | 3/2002 | Brodersen et al. | 705/9 |
| 2002/0032028 A1 | 3/2002 | Kaupe | |
| 2002/0035460 A1 | 3/2002 | Hales | |
| 2002/0040313 A1* | 4/2002 | Hunter et al. | 705/9 |
| 2002/0054082 A1 | 5/2002 | Karpf | |
| 2002/0072956 A1* | 6/2002 | Willems et al. | 705/10 |
| 2002/0073114 A1* | 6/2002 | Nicastro et al. | 707/500 |
| 2002/0181685 A1* | 12/2002 | Doherty et al. | 379/201.12 |
| 2002/0188488 A1* | 12/2002 | Hinkle | 705/8 |
| 2003/0018509 A1* | 1/2003 | Ossip et al. | 705/9 |
| 2003/0033184 A1* | 2/2003 | Benbassat et al. | 705/8 |
| 2003/0144892 A1* | 7/2003 | Cowan et al. | 705/8 |
| 2003/0182348 A1* | 9/2003 | Leong et al. | 709/100 |
| 2003/0204431 A1* | 10/2003 | Ingman | 705/9 |

FOREIGN PATENT DOCUMENTS

| | | |
|---|---|---|
| JP | 10143557 | 5/1998 |

OTHER PUBLICATIONS

L. Haugen, "A Study of Scheduling and Quality of Field-Service Support Systems," Ph.D. Thesis, University of Minnesota, Nov. 1993, pp. 1-251.*

Collins et al., "Automated Asignment and Scheduling of Service Personnel" IEEE Expert, vol. 9, No. 2, Apr. 1994, pp. 33-39.*

Hill, Arthur V., Naumann, J. David, & Chervany, Norman L.. (1983). SCAT and SPAT: Large-Scale Computer-Based Optimization Systems for the Personnel Assignment Problem. Decision Sciences, 14(2), 207.*

A. V. Hill, "An Experimental Comparison of Dispatching Rules for Field Service Support", Decision Sciences, vol. 23, No. 1, Winter 1992, pp. 235-249.*

Mark S. Fox & Stephen F. Smith "ISIS-A Knowledge-Based System for Factory Scheduling" The Robotics Institute, Carnegie-Mellon University; Expert Systems vol. 1, No. 1 (Jul. 1984).*

Thomas Dean & Mark Boddy "An Analysis of Time-Dependant Planning" AAAI-88 Proceedings (1988).*

John N. Tsitsiklis "Special Cases of Traveling Salesman and Repairman Problems with Time Windows" Networks. vol. 22 (1992) 263-282.*

AV Hill, VA Mabert, & DW Montgomery "A Decision Support System for the Courier Vehicle Scheduling Problem" Omega Int. J. of Mgmt. Sci., vol. 16, No. 4, pp. 333-345 (1988).*

Arthur V Hill "An Experimental Comparison of Dispatching Rules for Field Service Support" Decision Sciences vol. 23 Issue 1, pp. 235-249 (1992).*

Arthur V. Hill "An Experimental Comparison of Human Schedulers and Heuristic Algorithms for the Traveling Salesman Problem" Journal of Operations Management, vol. 2, Issue 4, pp. 215-223 (Aug. 1982).*

Monte Zweben "Anytime Rescheduling" Innovative Approches to Planning Scheduling and Control Workshop held at San Diego, CA (Nov. 1990).*

Arthur V. Hill "Chexpedite: A computer-based Approach to the Bank Courier Problem" Decision Sciences vol. 13 Issue 2, pp. 251-265 (1981).*

Mark S. Fox, Norman Sadeh, & Can Baykan "Constrained Heuristic Search" International Joint Conference On Artificial Intelligence, Proceedings of the 11th international joint conference on Artificial intelligence—vol. 1, pp. 309-315 (1989).*

Bahman Kalantari, Arthur V. Hill, Sant R. Arora "An Algorithm for the Traveling Salesman Problem with Pickup and Delivery" European Journal of Operational Research 22 pp. 377-386 (1983).*

Henri Prade "Using Fuzzy Set Theory in a Scheduling Problem: A Cae Study" Fuzzy Sets and Systems 2 pp. 153-165 (1979).*

Marmel, Microsoft Project 2000 Bible, Mar. 30, 2000, IDG Books Worldwide, Inc., p. 42-47, & 120.

Software Systems for Telecommunications, Science and technology Series, Bell Communications research, Oct. 1992, [retrieved from U.S. Appl. No. 08/608,838] pp. 34, 35, 53, 54, 58, 82, 83, 87, 93, 99, 100, 111-114, 139, 145, 146, 152, 153, 164.

First User Documentation, Southwestern Bell Telephone Company, Dec. 1995, Index, pp. 1-3, Section 1, p. 1, Section 2, pp. 1-2 [retrieved from U.S. Appl. No. 08/608,838.

"13 Step System Flow" and additional information, training memorandum prepared by Southwestern Bell Center of Learning, approx 1992 (first publically available Jul. 6, 1999) [retrieved from U.S. Appl. No. 08/608,838.

Rey, R. F., Engineering and Operations in the Bell System, AT&T Bell Laboratories, Murray Hill, NJ, 1984, pp. 605-621.

* cited by examiner

METHODS AND SYSTEMS FOR ASSIGNING MULTIPLE TASKS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, however, the copyright owner otherwise reserves all copyrights whatsoever.

BACKGROUND OF THE INVENTION

1. Field of the Invention

This invention generally relates to computers and to telecommunications and, more particularly, to methods and systems for assigning multiple tasks to one or more technicians when repairing a telecommunications network.

2. Description of the Related Art

When a telecommunications network requires repair, technicians are currently assigned based upon schedule, turf, and skills. The current Integrated Dispatch System analyzes a technician's work schedule and the estimated time to complete a task. The Integrated Dispatch System, for example, analyzes the technician's work schedule and determines how much available time the technician can work. Once the technician's schedule is known, the Integrated Dispatch System then searches for tasks that match the technician's skill level and turf. Lastly, the Integrated Dispatch System then selects a task that can be completed within the technician's available time. The Integrated Dispatch System repeats this process to determine the most efficient assignment of tasks.

An example provides further illustration. Assume the Integrated Dispatch System has three pending tasks (or "jobs"). Each of these three pending jobs is estimated to require three hours to complete (e.g., each job has a three hour "duration"). So, the Integrated Dispatch System has nine hours of work to assign. If the technician works an eight-hour day, the Integrated Dispatch System cannot assign all three jobs to a single technician—the amount of work exceeds the technician's available work time. The technician only receives two jobs, for a total of six hours of work. So, even though the technician works an eight-hour day, the Integrated Dispatch System is constrained and can only assign six hours of work. The Integrated Dispatch System is thus forced to inefficiently assign jobs.

The problem is that the estimated completion times are really averages. Each task has an average time for completion. Sometimes the task requires more than the average time, and sometimes the task requires less than the average time. So, in the above example, even though the technician may be able to complete all three tasks in an eight-hour day, the current Integrated Dispatch System is forced to inefficiently assign tasks based upon the average completion time.

There is, accordingly, a need in the art for an Integrated Dispatch System that permits assigning multiple tasks to a technician, a need for methods and systems that assign tasks independent of a technician's work schedule, and a need for methods and systems that assign tasks independent of the duration of the tasks.

BRIEF SUMMARY OF THE INVENTION

The aforementioned problems are reduced by an enhanced Integrated Dispatch System. This enhanced Integrated Dispatch System comprises computer programs and computer systems for dispatching work orders for the repair of a telecommunications system. This invention allows multiple tasks to be assigned to one or more technicians. As the telecommunications network needs repair, the present invention allows more than one task to be assigned to each technician. This enhanced Integrated Dispatch System assigns tasks (or "jobs") independent of the technician's work schedule. This enhanced Integrated Dispatch System also assigns tasks independent of the estimated time for completion of the task. A user of this enhanced Integrated Dispatch System can assign multiple tasks to one technician or to a group of technicians. The user can specify how many tasks get assigned, and the user can even specify how many tasks should be completed by a predefined time. The enhanced algorithm more efficiently assigns tasks and, thus, allows more tasks per day. Because this invention permits more repairs per day, this invention, therefore, also improves customer satisfaction with their telecommunications service.

One aspect of this invention describes a method for assigning multiple tasks to a technician. The Integrated Dispatch System allows a user to interface and assign multiple tasks to multiple technicians. Each task describes provisioning or repair of a telecommunications network. The method displays a graphical user interface on a computer, and the graphical user interface indicates the assignment of the multiple tasks.

Still another embodiment describes a computer system for assigning multiple tasks to multiple technicians. The system has the Integrated Dispatch System stored in a memory device. The Integrated Dispatch System manages the dispatch of work orders in a telecommunications network. The Integrated Dispatch System allows a user to assign multiple tasks to at least one technician. Each task describes a repair of the telecommunications network. A processor communicates with the memory device.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
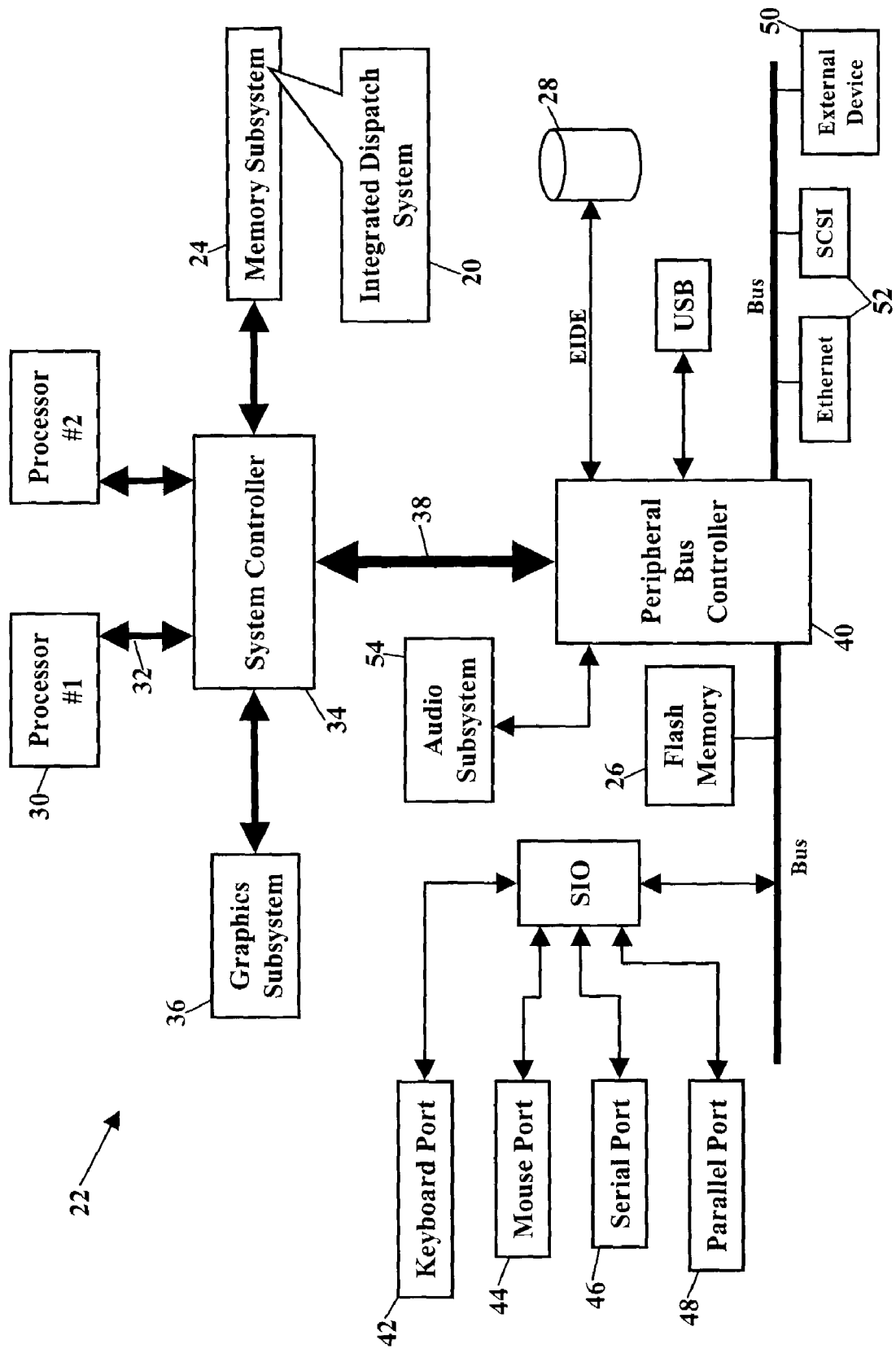
FIG. 1 is a block diagram showing one embodiment of the Integrated Dispatch System that resides in a computer system.

FIG. 1 depicts one possible operating environment for an embodiment of this invention. This embodiment of an Integrated Dispatch System 20 includes a computer program that allows a user to assign multiple tasks to one or more technicians. As the user assigns multiple tasks to a technician or to a group of technicians, the Integrated Dispatch System 20 displays the technicians via a graphical user interface on a computer. The user can indicate which technicians are to be assigned, such as by highlighting the name of each desired technician. The Integrated Dispatch System 20 may also allow the user to display a calendar or a schedule, so that the multiple tasks can be assigned for multiple days. The Integrated Dispatch System 20 may also permit the user to specify how many tasks get assigned and even how many tasks should be completed by a predefined time. The Integrated Dispatch System 20 then applies the assignments when planning the most efficient repair of the telecommunications network.

FIG. 1 is a block diagram showing the Integrated Dispatch System 20 residing in a computer system 22. The Integrated Dispatch System 20 operates within a system memory device. The Integrated Dispatch System 20, for example, is shown residing in a memory subsystem 24. The Integrated Dispatch System 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is a UNIX®-based system (UNIX® is a registered trademark of The Open Group, 44 Montgomery Street, Suite 960, San Francisco, Calif. 94104, 415.374.8280, www.opengroup.org). Other operating systems, however, are also suitable. Such other operating systems would include WINDOWS® (WINDOWS® is a registered trademark of Microsoft Corporation, One Microsoft Way, Redmond Wash. 98052-6399, 425.882.8080, www.Microsoft.com). WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

Figure 2:
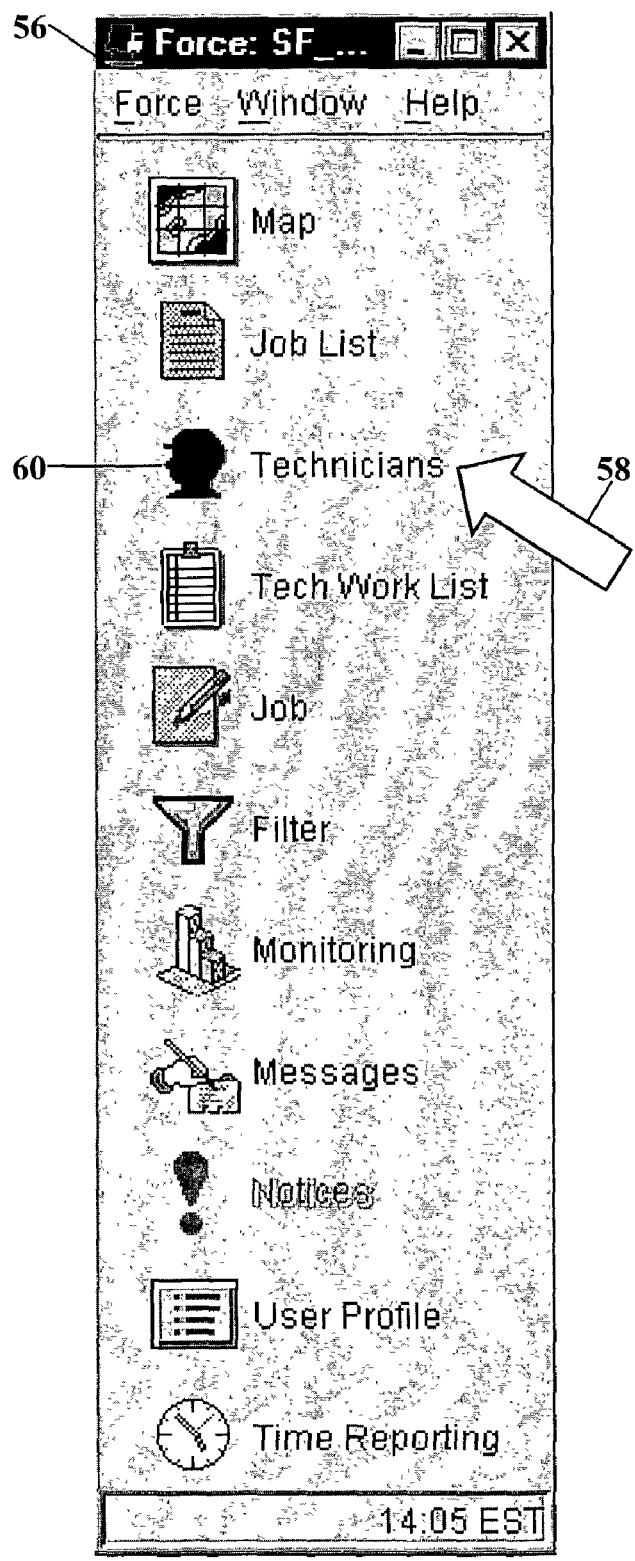
FIG. 2 is a screen shot showing an analyst graphical user interface.

FIG. 2 is a screen shot showing an analyst graphical user interface 56. The analyst graphical user interface 56 is just one menu of options presented by the Integrated Dispatch System (shown as reference numeral 20 in FIG. 1) on a computer display. When a user wants to assign multiple tasks to one or more technicians, the user requests a list of technicians from the Integrated Dispatch System. While the user could enter various commands to obtain this list of technicians, FIG. 2 shows the simple, user-friendly analyst graphical user interface 56. The user places a cursor 58 on the "Technicians" option 60, and the Integrated Dispatch System produces the list of technicians.

Figure 3:
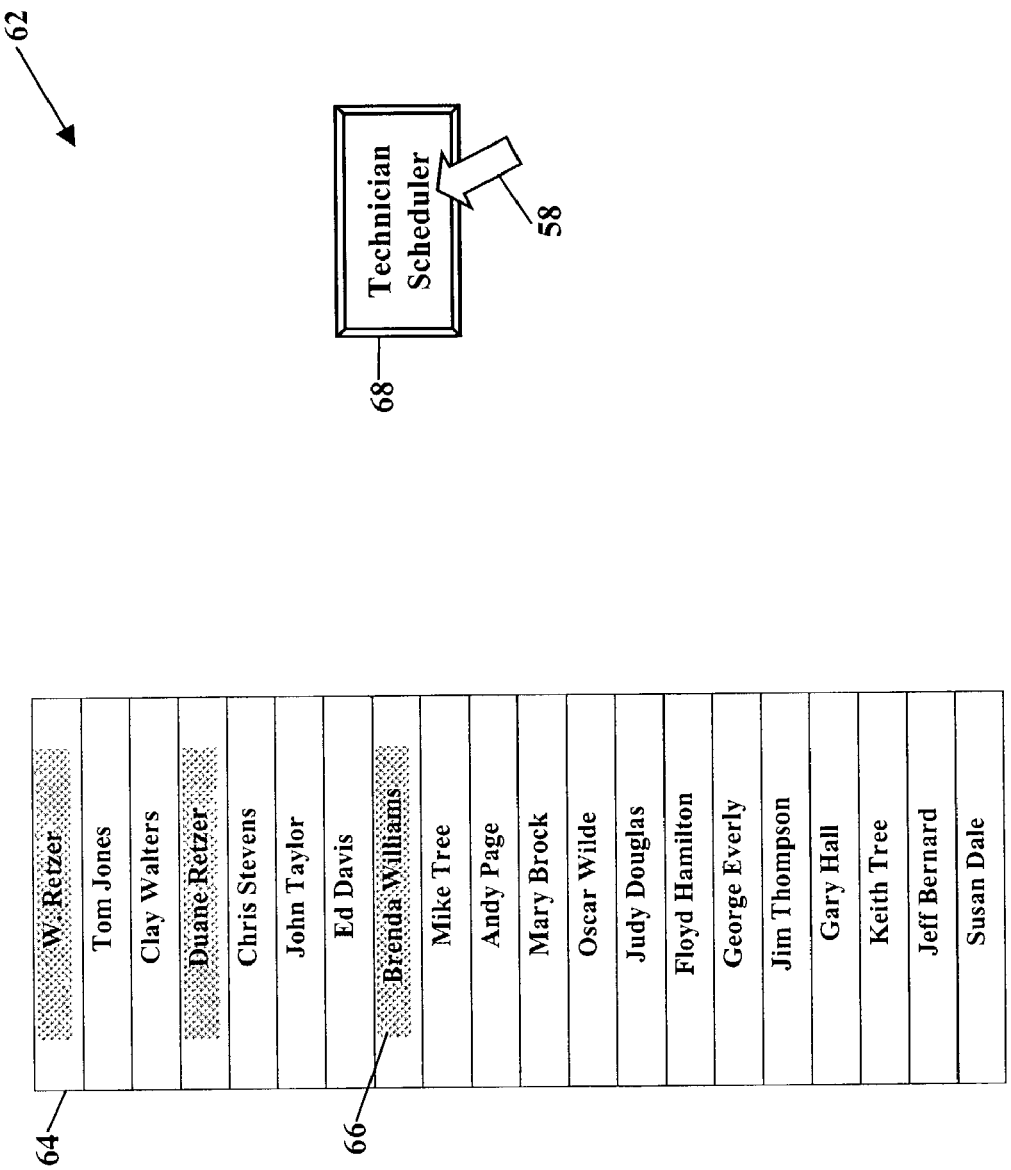
FIG. 3 is a schematic representing a technician graphical user interface according to one aspect of this invention.

FIG. 3 is a schematic representing a technician graphical user interface 62. This technician graphical user interface 62 displays a list 64 of technician names. The list 64 of technician names contains some or all of the technicians available to the user. The technician names could be sorted or arranged by area, by supervisor, by manager, by turf, by skill level, or by any other desired grouping or affiliation (such as assignment group). FIG. 3, for simplicity, shows a short listing of twenty (20) technicians (there could be 100 or more technicians listed for a large metropolitan area). Once the list 64 of technician names is displayed, the Integrated Dispatch System (shown as reference numeral 20 in FIG. 1) allows the user to assign multiple tasks to one or more technicians. The user interfaces with the Integrated Dispatch System and selects the names of the technicians to be assigned multiple tasks. The Integrated Dispatch System accepts any means of selecting the names of technicians, but the user preferably interfaces using a touch-sensitive device. The user, for example, uses a mouse, a keyboard, touch-sensitive display, a light pen, or other device to highlight 66 the name of a technician to be assigned multiple tasks.

Once the user highlights the technicians to be assigned, the user then selects what days the technicians will be assigned multiple tasks. FIG. 3 also shows a technician scheduler control button 68. The user again interfaces with the Integrated Dispatch System and selects the technician scheduler control button 68. The Integrated Dispatch System, as before, accepts any means of selecting the technician scheduler control button 68, but the user preferably interfaces using the touch-sensitive device to select technician scheduler control button 68. The user places the cursor 58 on the technician scheduler control button 68, and the Integrated Dispatch System produces the technician scheduler.

Figure 4:
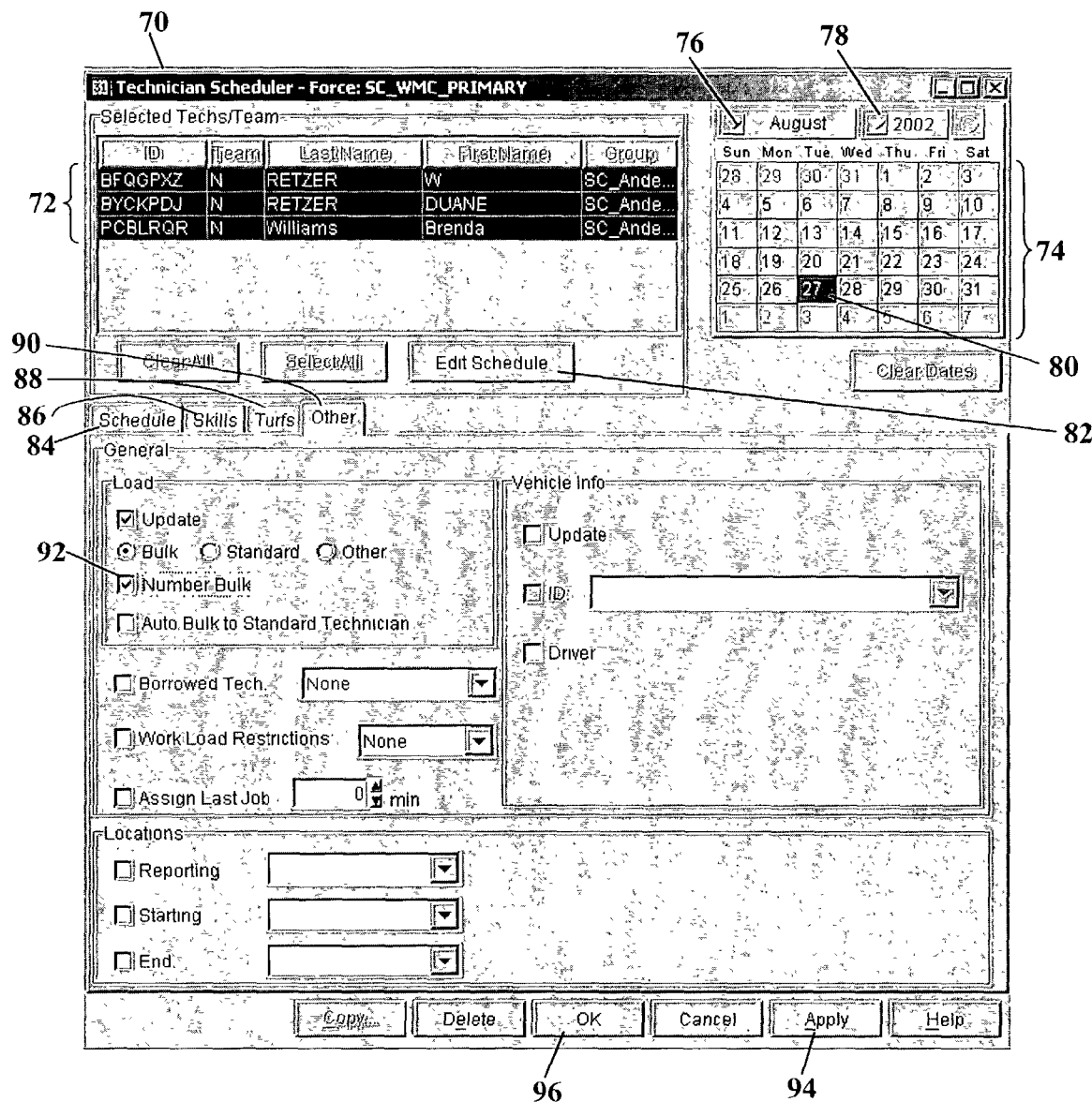
FIG. 4 is a screen shot representing a technician scheduler graphical user interface according to one aspect of this invention.

FIG. 4 is a screen shot representing a technician scheduler graphical user interface 70. When the user wishes to assign multiple tasks, the user selects the "Technician Scheduler" control button (shown as reference numeral 68 in FIG. 3). The Integrated Dispatch System then causes the technician scheduler graphical user interface 70 to be presented on the display device of the computer system. The technician scheduler graphical user interface 70 shows a list 72 of the technicians selected for multiple tasks. If the user sorted the technicians by area, supervisor, manager, turf, skill level, or any other desired grouping or affiliation (as discussed in paragraph [0017] with reference to FIG. 3), the list 72 would, instead, show the sorted result(s).

FIG. 4 also shows a calendar 74. Once the user selects the technicians to be assigned multiple tasks, the user then uses the calendar 74 to select which days the technicians will be assigned multiple tasks. The calendar may display a day, a week, or a month of a year. The calendar could also represent a daily, weekly, or monthly work schedule. A month control button 76 and a year control button 78 allow the user to select the desired day, week, or month. The user again interfaces with the Integrated Dispatch System and selects the desired day the multiple tasks will be assigned. The Integrated Dispatch System, as before, accepts any means of selecting the day of assignment, but the user preferably interfaces using the touch-sensitive device to highlight 80 the desired day. As FIG. 4 shows, if the user wishes to assign the multiple technicians to multiple days, the user simply selects all the desired days of assignment.

The user then selects the "Edit Schedule" control button 82 using the touch-sensitive device. The Integrated Dispatch System responds and causes the technician scheduler graphical user interface 70 to present tabs "Schedule," "Skills," "Turfs," and "Other" (shown, respectively, as reference numerals 84, 86, 88, and 90). As FIG. 4 shows, when the "Other" tab 90 is selected, a "Number Bulk" attribute 92 is offered. When the user activates the "Number Bulk" attribute 92, multiple tasks may then be assigned to the list 72 of the technicians. The Integrated Dispatch System, as before, accepts any means of activating the "Number Bulk" attribute 92, but the user preferably interfaces using the touch-sensitive device. The "Number Bulk" attribute 92 indicates assignment of the multiple tasks. The "Number Bulk" attribute 92 is applied to the list 72 of technicians (if the user sorted the technicians, as discussed in paragraph [0017], the list 72 would, instead, show the sorted results). The "Number Bulk" attribute 92 may be a default setting, and/or the "Number Bulk" attribute 92 could be modified on a per date basis. The "number Bulk" attribute 92 may be applied to one or more technicians at the same time. The "Number Bulk" attribute 92 is then applied using an "Apply" control button 94, and an "OK" control button 96 closes the technician scheduler graphical user interface 70.

Figure 5:
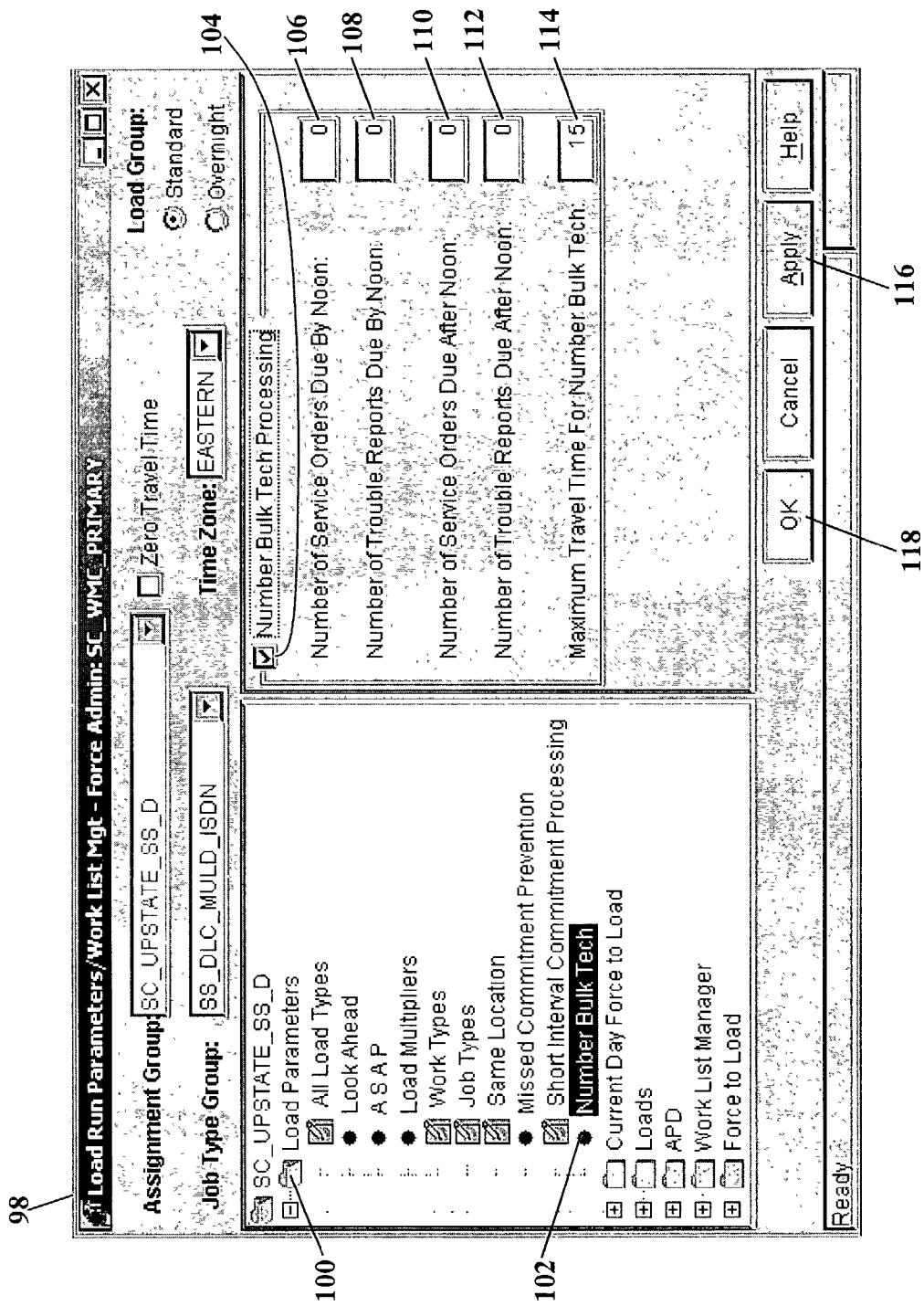
FIG. 5 is a screen shot representing a number bulk tech graphical user interface according to one aspect of this invention.

FIG. 5 is a screen shot representing a number bulk tech graphical user interface 98. Once the "Number Bulk" attribute (shown as reference numeral 92 in FIG. 4) is applied, the user may then specify further details for assigning multiple tasks. The number bulk tech graphical user interface 98 is accessed from a "Load Parameters" folder 100 and then a "Number Bulk Tech" subfolder 102. The user activates the number bulk tech graphical user interface 98 by selecting a "Number Bulk Tech Processing" attribute 104. The "Number Bulk Tech Processing" attribute 104 indicates assignment of the multiple tasks. The Integrated Dispatch System accepts any means of activating the "Number Bulk Tech Processing" attribute 104, but the user preferably interfaces using the touch-sensitive device.

Once the "Number Bulk Tech Processing" attribute 104 is activated, the user can specify how the multiple tasks are assigned. The user, for example, may specify a quantity of tasks to be assigned to one or more technicians, and the user may further specify the quantity of tasks to be completed by a predefined time. As FIG. 5 shows, a first data field 106 allows the user to specify the number of service orders due by noon that should be assigned to each technician. A second data field 108 allows the user to specify the number of trouble reports due by noon that should be assigned to each technician. "Service orders" are work orders describing service to the telecommunications network, while "trouble reports" are work orders describing a required repair order for the telecommunications network. A third data field 110 permits the user to specify the number of service orders due after noon that should be assigned to each technician. A fourth data field 112 allows the user to specify the number of trouble reports due after noon that should be assigned to each technician. A fifth data field 114 permits the user to also specify a maximum travel time that will be permitted for assignment of a job by the "Number Bulk" process.

The "Number Bulk" attribute 104 assigns multiple tasks to each technician. The "Number Bulk" attribute, for example, assigns the specified number of tasks (or "jobs"), for each category (represented by data fields 106, 108, 110, and 112), to each technician with the "Number Bulk" attribute (e.g., list 72 of technicians shown in FIG. 4). If a work order assignment system is unable to assign the specified number of "before noon" tasks to a technician, then "after noon" tasks of the same work type may be assigned to satisfy the "before noon" quantity. All "before noon" tasks are scheduled earlier than "after noon" tasks, and all assignments made by the "Number Bulk" attribute are locked to the technician's work list. As those of ordinary skill now realize, this "Number Bulk" attribute assigns multiple tasks independent of the technician's schedule and independent of a duration of the task. The estimated start and completion times for a task are then discounted when assigning the multiple tasks. If, however, the estimated start and completion times for a job fall completely outside a technician's work schedule, the task is not assigned to that technician. Any tasks not completed by a predefined time or date are then reloaded into the Integrated Dispatch System for reassignment.

When multiple tasks are assigned, the multiple tasks may have a similar or common characteristic. One or more technicians, for example, may be assigned multiple tasks having similar skills. The term "skills" describes one or more qualifications for repairing or for provisioning a telecommunications network. A technician could be assigned multiple tasks occurring within a single turf or a range of turfs. The term "turf," as used herein, denotes a geographic area within a telecommunications network. A turf could be a territory, a wire center, the boundary of one or more wire centers, or a portion of a wire center. A turf could be a composite of geographic areas, and the geographic areas may or may not be contiguous. A technician could also be assigned multiple tasks all having the same job type (e.g., buried service wires), or the technician could be assigned multiple tasks having a range of job types. Certain tasks could even be excluded from the multiple tasks, such as any jobs outside a technician's turfs or beyond a technician's skills. The multiple tasks could be assigned by geographic area, such as when a group of technicians are assigned all tasks occurring in a particular subdivision.

Once the "by noon" and the "after noon" data fields are defined, the "Number Bulk Tech Processing" attribute 104 is applied. The user selects an "Apply" control button 116, and an "OK" control button 118 closes the number bulk tech graphical user interface 98. Now that the "Number Bulk"

process is defined, the Integrated Dispatch System determines the most efficient provisioning and/or repair of the telecommunications network. As work orders are generated, the Integrated Dispatch System dynamically reviews the list 72 of selected "Number Bulk" technicians, their turfs, and their skill levels. The Integrated Dispatch System then tries to determine the most efficient and multiple work order assignments for the quickest, most economical dispatch.

Figure 6:
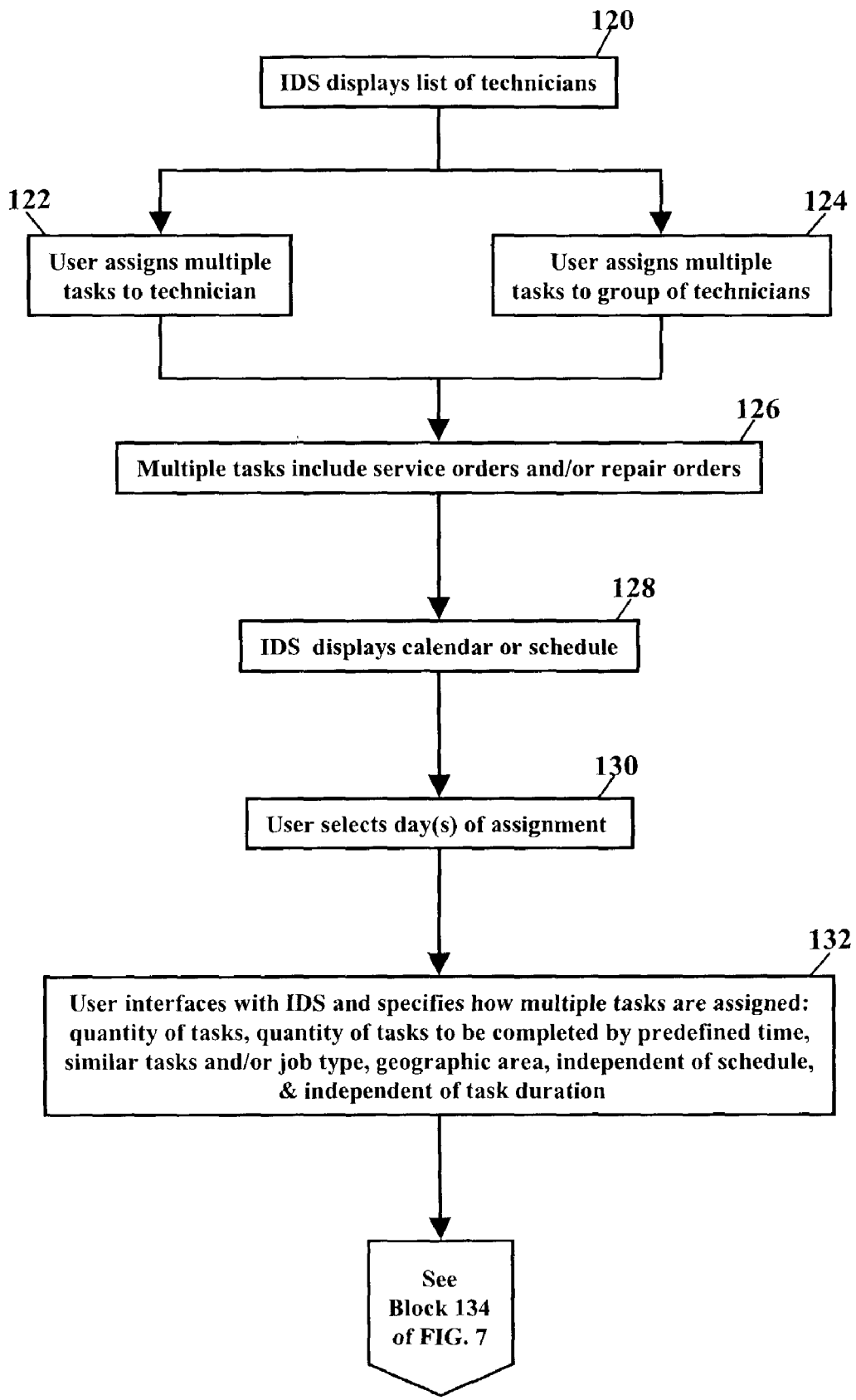
FIGS. 6 and 7 are flowcharts showing one method of assigning multiple tasks to one or more technicians.
Figure 7:
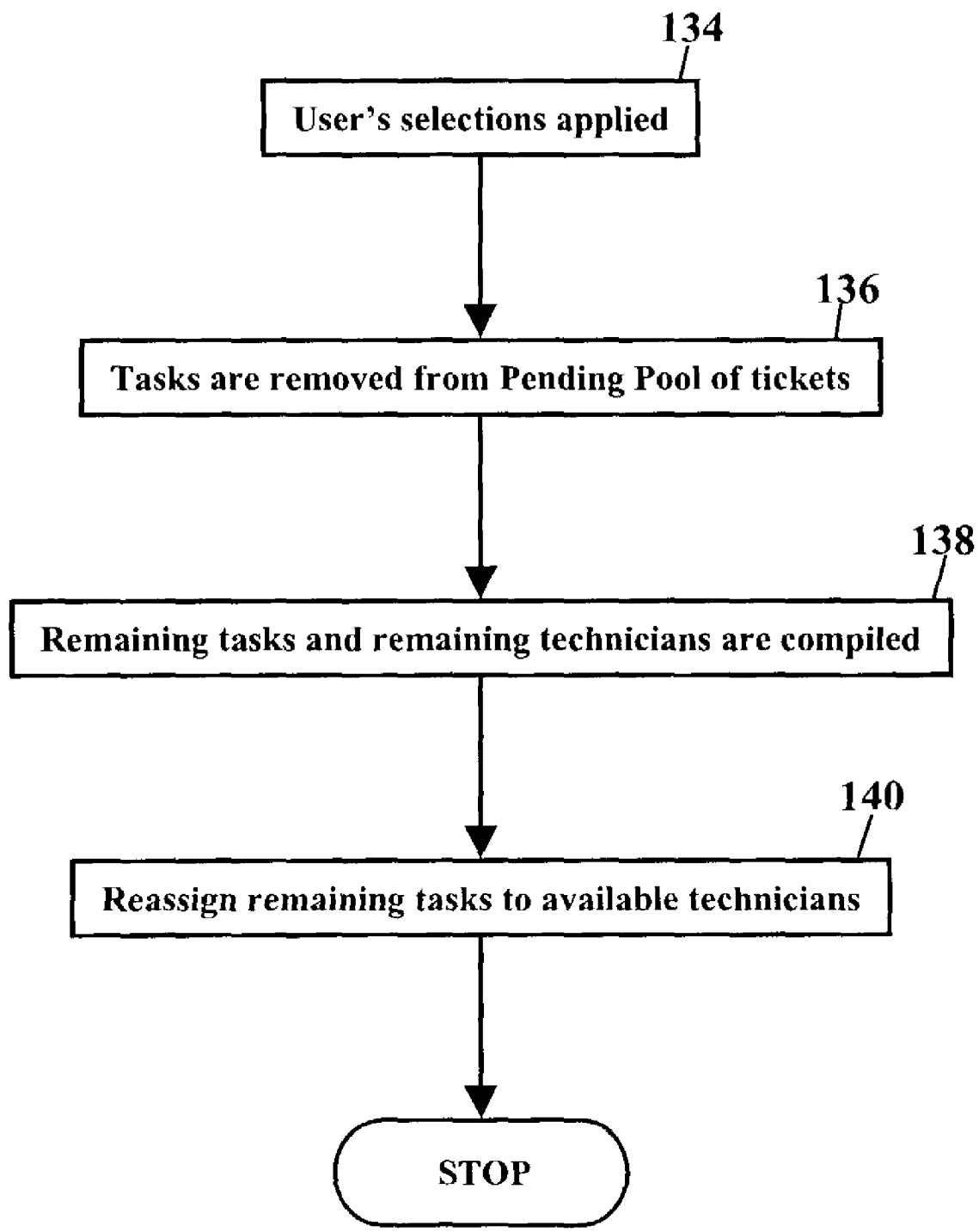

FIGS. 6 and 7 are flowcharts showing one method of assigning multiple tasks to one or more technicians. An Integrated Dispatch System (IDS) displays a list of technicians (Block 120). A user interfaces with the Integrated Dispatch System and assigns multiple tasks to at least one technician (Block 122). Each task describes a repair of a telecommunications network. The user could also assign multiple tasks to a group of technicians (Block 124). The multiple tasks may include service orders and/or repair orders (Block 126) (repair orders are commonly referred to as "trouble reports"). The Integrated Dispatch System may also display a calendar or schedule (Block 128), so the user may select at least one day for which the multiple tasks will be assigned (Block 130). The user interfaces with the Integrated Dispatch System and specifies how the multiple tasks are assigned. (Block 132). The user, for example, may determine the quantity of tasks to be assigned to the technician, and the user may specify the quantity of tasks to be completed by a predefined time. The user could assign similar tasks and/or a job type to the at least one technician. The user could also assign the multiple tasks by geographic area. The multiple tasks may be assigned independent of the technician's schedule and/or assigned independent of a duration of the task.

The flowchart continues with FIG. 7. The user's selections are applied (Block 134) and tasks are removed from the Pending Pool of tickets (Block 136). If any tasks are not completed by a predefined time, these remaining tasks and remaining technicians are compiled (Block 138). The remaining tasks are then reassigned to available technicians (Block 140).

The Integrated Dispatch System (shown as reference numeral 20 in FIG. 1), including the methods of the present invention, may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the this invention, allow the Integrated Dispatch System to be easily disseminated. A computer program product, for assigning multiple tasks to at least one technician, comprises the computer-readable medium and the Integrated Dispatch System. The Integrated Dispatch System is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for assigning multiple tasks to technicians, comprising:

allowing a user to interface on a computer display with an integrated dispatch system and to assign multiple tasks to a group of technicians;

displaying an analyst graphical user interface that presents a menu of options comprising an icon to select a list of technicians;

receiving the user's first selection of the icon to request the list of technicians;

displaying a technician graphical user interface that provides the list of technicians and a technician scheduler control button;

receiving the user's second selection of multiple technicians from the list of technicians displayed by the technician graphical user interface;

receiving the user's third selection of the technician scheduler control button to assign multiple tasks to the multiple technicians;

displaying the multiple technicians, a monthly calendar, and an Edit Schedule control button in a technician scheduler graphical user interface;

receiving the user's fourth selection of a day in the monthly calendar for which the multiple technicians will be assigned the multiple tasks;

receiving the user's fifth selection of the Edit Schedule control button to assign the multiple tasks to the multiple technicians;

displaying a number bulk attribute in the technician scheduler graphical user interface in response to the user's fifth selection of the Edit Schedule control button;

receiving the user's sixth selection of the number bulk attribute;

when the user selects the number bulk attribute to assign the multiple tasks to the multiple technicians for the day in the monthly calendar, then displaying a number bulk tech graphical user interface comprising a data field for specifying a first quantity of tasks to be completed by a technician before a predefined time of the day and another data field for specifying a second quantity of tasks to be completed by the technician after the predefined time of the day; and when the integrated dispatch system is unable to assign the first quantity of tasks to the technician, then satisfying the first quantity of tasks by assigning at least one task from the second quantity of tasks to the technician such that the technician completes the first quantity of tasks before the predefined time of day.

2. A method according to claim 1, further comprising specifying a quantity of tasks to be assigned to the technician.

3. A method according to claim 1, further comprising specifying a maximum travel time for a task.

4. A method according to claim 1, further comprising reassigning any tasks not completed by a predefined time.

5. A method according to claim 1, wherein assigning the multiple tasks comprises assigning at least one service order.

6. A method according to claim 1, wherein assigning the multiple tasks comprises assigning similar tasks to the technician.

7. A method according to claim 6, wherein assigning the similar tasks comprises assigning a job type to the technician.

8. A method according to claim 1, further comprising receiving an input into the data field.

9. A method according to claim 1, wherein assigning the multiple tasks comprises assigning the multiple tasks by geographic area.

10. A system for assigning multiple tasks to technicians, comprising:
a computer memory;

one or more computer processors;
a computer readable medium; and
computer executable code stored on the computer readable medium, wherein the computer executable code, when executed by the one or more computer processors, performs the steps of:
interfacing on a computer display with an integrated dispatch system to assign multiple tasks to a group of technicians;
displaying an analyst graphical user interface that presents a menu of options comprising an icon to select a list of technicians;
receiving a user's first selection of the icon to request the list of technicians;
displaying a technician graphical user interface that provides the list of technicians and a technician scheduler control button;
receiving the user's second selection of multiple technicians from the list of technicians displayed by the technician graphical user interface;
receiving the user's third selection of the technician scheduler control button to assign multiple tasks to the multiple technicians;
displaying the multiple technicians, a monthly calendar, and an Edit Schedule control button in a technician scheduler graphical user interface;
receiving the user's fourth selection of a day in the monthly calendar for which the multiple technicians will be assigned the multiple tasks;
receiving the user's fifth selection of the Edit Schedule control button to assign the multiple tasks to the multiple technicians;
displaying a number bulk attribute in the technician scheduler graphical user interface in response to the user's fifth selection of the Edit Schedule control button;
receiving the user's sixth selection of the number bulk attribute;
when the user selects the number bulk attribute to assign the multiple tasks to the multiple technicians for the day in the monthly calendar, then displaying a number bulk tech graphical user interface comprising a data field for specifying a first quantity of tasks to be completed before a predefined time of day and for specifying a second quantity of tasks to be completed after the predefined time of the day;
when the integrated dispatch system is unable to assign to a technician the first quantity of tasks to the technician, then satisfying the first quantity of tasks by assigning at least one task from the second quantity of tasks to the technician such that the technician completes the first quantity of tasks before the predefined time of day;
locking the first quantity of tasks and the second quantity of tasks to the technician's work list; and
discounting an estimated start and completion time for the task.

11. A system according to claim 10, wherein the code further causes the processor to specify a quantity of tasks to be assigned to the technician.

12. A system according to claim 10, wherein the code further causes the processor to reassign any tasks not completed by a predefined time.

13. A system according to claim 10, wherein the code further causes the processor to assign the multiple tasks by geographic area.

14. A computer executable program product comprising computer executable instructions tangibly embodied on a computer readable medium that when executed by a computer performs the method steps for assigning multiple tasks to technicians comprising:
interfacing on a computer display with an integrated dispatch system to assign multiple tasks to a group of technicians;
displaying an analyst graphical user interface that presents a menu of options comprising an icon to select a list of technicians;
receiving a user's first selection of the icon to request the list of technicians;
displaying a technician graphical user interface that provides the list of technicians and a technician scheduler control button;
receiving the user's second selection of multiple technicians from the list of technicians displayed by the technician graphical user interface;
receiving the user's third selection of the technician scheduler control button to assign multiple tasks to the multiple technicians;
displaying the multiple technicians, a monthly calendar, and an Edit Schedule control button in a technician scheduler graphical user interface;
receiving the user's fourth selection of a day in the monthly calendar for which the multiple technicians will be assigned the multiple tasks;
receiving the user's fifth selection of the Edit Schedule control button to assign the multiple tasks to the multiple technicians;
displaying a number bulk attribute in the technician scheduler graphical user interface in response to the user's fifth selection of the Edit Schedule control button;
receiving the user's sixth selection of the number bulk attribute;
specifying a first quantity of tasks to be completed before a predefined time of day;
specifying a second quantity of tasks to be completed after the predefined time of the day;
when the integrated dispatch system is unable to assign to a technician the first quantity of tasks to the technician, then satisfying the first quantity of tasks by assigning at least one task from the second quantity of tasks to the technician such that the technician completes the first quantity of tasks before the predefined time of day;
locking the first quantity of tasks and the second quantity of tasks to the technician's work list; and
discounting an estimated start and completion time for the task.

* * * * *